(12) United States Patent
Sullivan

(10) Patent No.: US 8,235,319 B2
(45) Date of Patent: Aug. 7, 2012

(54) DISPOSAL OF HUMAN REMAINS

(76) Inventor: Alexander Sullivan, Stepps (GB)

( * ) Notice: Subject to any disclaimer, the term of this patent is extended or adjusted under 35 U.S.C. 154(b) by 0 days.

(21) Appl. No.: 13/012,371

(22) Filed: Jan. 24, 2011

(65) Prior Publication Data

US 2011/0130612 A1    Jun. 2, 2011

Related U.S. Application Data

(62) Division of application No. 12/680,696, filed as application No. PCT/GB08/050897 on Oct. 3, 2008.

(30) Foreign Application Priority Data

Oct. 5, 2007    (GB) .................................. 0719482.2

(51) Int. Cl.
*B02C 13/286*    (2006.01)
(52) U.S. Cl. ........................................................ 241/301
(58) Field of Classification Search ............... 241/1, 301
See application file for complete search history.

(56) References Cited

U.S. PATENT DOCUMENTS

2007/0038013 A1*  2/2007  Wilson et al. ................. 588/318
2009/0311766 A1*  12/2009  Muth ......................... 435/173.1

FOREIGN PATENT DOCUMENTS

| DE | 2361480 | 6/1975 |
| DE | 3014616 | 10/1981 |
| NL | 1009284 | 11/1999 |
| WO | WO 2010013029 A1 * | 2/2010 |

OTHER PUBLICATIONS

"Opinion and Report on: The Treatment of Animal Waste by Means of High Temperature (150° C., 3 Hours) and Corresponding High Pressure Alkaline Hydrolysis", European Commission Health & Consumer Protection Directorate-General, Scientific Steering Committee Meeting of May 16, 2002, pp. 1-18.

* cited by examiner

*Primary Examiner* — Faye Francis
(74) *Attorney, Agent, or Firm* — Dickinson Wright PLLC

(57) ABSTRACT

An alkaline hydrolysis unit, and method of using the same to dispose of a cadaver, the alkaline hydrolysis unit comprising: a chamber for receiving a cadaver to be chemically decomposed, the chamber including a head-receiving part intended to receive the head of a cadaver; a recirculation pump fluidly connected to the chamber of the alkaline hydrolysis unit and adapted to recirculate fluids within the chamber; a head retaining means locatable in the chamber for retaining the head of the cadaver in the head-receiving part of the chamber; and at least one recirculation jet fluidly connected to the recirculation pump and positioned to aim fluid from the recirculation pump at the head-receiving part of the chamber.

12 Claims, 11 Drawing Sheets

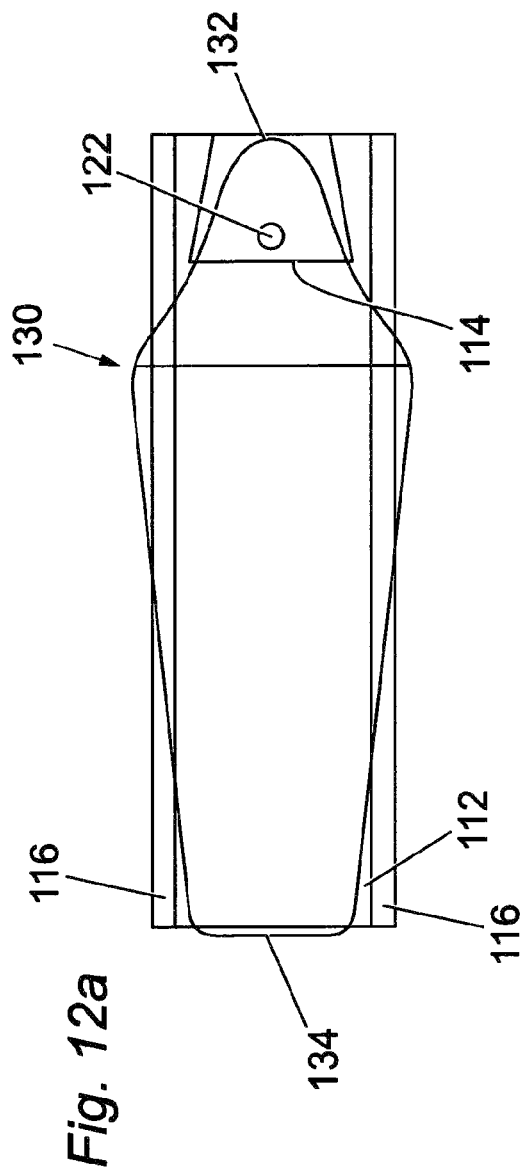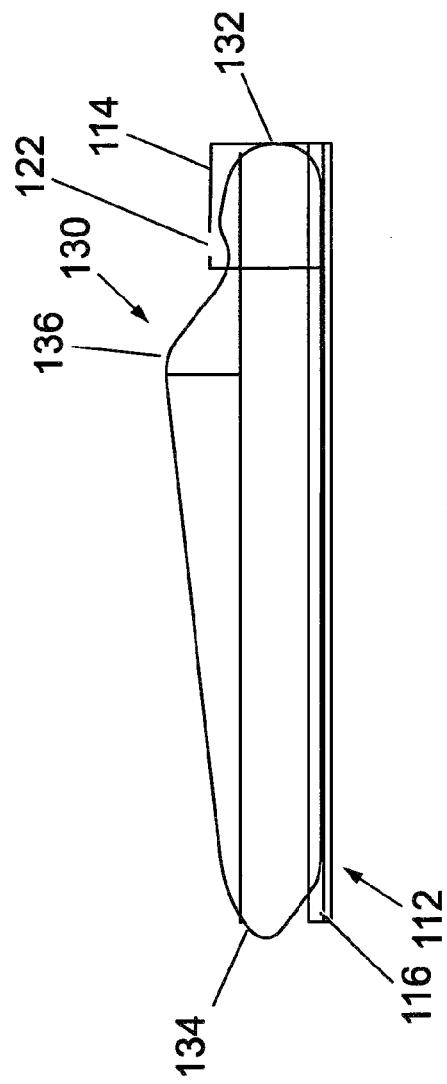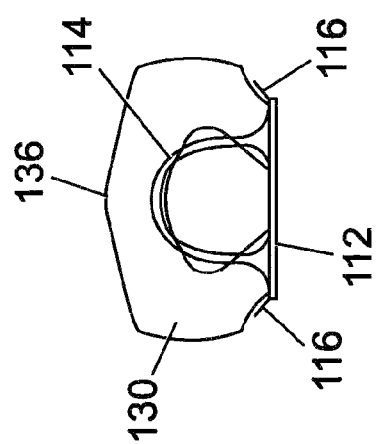
Fig. 12a
Fig. 12b
Fig. 12c

DISPOSAL OF HUMAN REMAINS

CROSS REFERENCE TO RELATED APPLICATION

The present application claims the benefit of priority to, and is a Divisional application of, U.S. patent application Ser. No. 12/680,696, filed Mar. 29, 2010, which in turn is a 35 U.S.C. §371 national stage filing of International Patent Application No. PCT/GB08/050897, filed Oct. 3, 2008, and through which priority is claimed to Great Britain Patent Application No. 0719482.2, filed Oct. 5, 2007, the disclosures of which applications are incorporated herein by reference in their entireties.

The present invention relates to the disposal of human remains. In particular, the invention relates to disposal by alkaline hydrolysis. A coffin for use in an alkaline hydrolysis process, an alkaline hydrolysis unit and a method and system for disposing of a cadaver are also described.

The disposal of human remains after death is currently done by either burial or cremation. Due to a lack of suitable and accessible land and the high costs involved, cremation is becoming preferable to burial. However, cremation causes harmful emissions in the form of dioxins and mercury. Mercury is a big problem and in Europe, there is legislation pending to force crematoria to filter abate their emissions. This is expensive and also requires very bulky equipment that takes up a lot of room.

A further problem with cremation is that it uses a lot of gas, and produces large amounts of carbon dioxide, a greenhouse gas, which contributes to global warming. A further disadvantage of cremation is the organic building blocks that make up the body and come from the ecosystem are lost forever during the burning process.

Some problems with known alkaline hydrolysis methods used for disposal of regulated waste in hospitals, are that the alkaline hydrolysis unit needs to be heated up for each load of waste, and then cooled down, so that the waste fluids produced are cool enough to be received by the local sewer system. This uses a lot of energy, and causes long time intervals between the disposal of successive waste loads. The energy used in heating and cooling is typically wasted, which contributes to global warming.

When disposing of regulated waste in hospitals, it is known to recirculate fluids within a decomposition unit by means of a recirculation pump. The hotter the operating temperature of the decomposition unit, the faster and more efficiently the decomposition unit can operate. However, in the known processes, the maximum operating temperature of the decomposition unit is limited by the maximum operating temperature that the recirculation pump can tolerate. This is typically only up to 155 degrees Celsius.

According to a first aspect of the invention there is provided a coffin for use in an alkaline hydrolysis process, the coffin comprising a dissolvable receptacle for a cadaver, the dissolvable receptacle being dissolvable in the alkaline hydrolysis process.

By "coffin", we mean any receptacle adapted to receive a cadaver. The term "coffin" is not limited to boxes, but can also encompass other cadaver receptacles, such as bags and rigid/flexible containers of non-cuboid shapes, as will be explained.

Substantially all of the dissolvable receptacle is decomposable in the alkaline hydrolysis process, together with the cadaver. Optionally, the coffin is fully dissolvable in the alkaline hydrolysis process.

Optionally, the coffin is provided with an outer casing.

The outer casing typically resembles a conventional, wooden coffin, for presentation to the public, and is removed prior to the alkaline hydrolysis process. Typically, the outer casing comprises one or more wooden panels sized to at least partially surround the coffin. The panels may be securable to the coffin or to a support frame used with the coffin.

Typically, the dissolvable receptacle comprises one or more of silk, wool, or a bioplastic material.

Optionally, the entire dissolvable receptacle is bioplastic.

Bioplastics are made from organic sources, such as plant starch and sugar cane, instead of from petroleum. Once disposed of, many bioplastics will safely and naturally biodegrade. Most or all bioplastic materials are fully dissolvable by alkaline hydrolysis.

Advantages of bioplastic materials include that they may be strong, waterproof, light, simple to manufacture, and inexpensive. Waterproof embodiments do not require an additional waterproof liner. Additionally, the fact that bioplastic materials dissolve with the body makes them environmentally-friendly, since they will not end up in landfill sites, and they do not require any additional expenditure of energy to destroy.

Since at the end of the process, the coffin is dissolved together with the cadaver, there is no need to clean and return any parts of the coffin for future use. A bioplastic coffin also allows more rapid emptying and cleaning of the alkaline hydrolysis unit.

Optionally, the bioplastic coffin comprises a substantially rigid container, which may or may not have a lid or cover. A suitable bioplastic material for forming such a container is known as "Mater-Bi TF01U/095R" and is available from Novamont SpA, Via Fauser, 8 I-28100 Novara, Italy.

The term "substantially rigid" is to be construed to mean solid in the sense of a box, in contrast to the more cloth-like flexibility of a bag or fabric.

Hence, "substantially rigid" encompasses box-like containers of any shape, made from resilient materials.

Optionally, the container is injection-moulded. The coffin may be formed in any required shape. For example, the coffin could be formed as a hollow cuboid box, as is conventional. Alternatively, other shapes can be used, for example more closely following the contours of a human body. Optionally, the shape of the coffin may be designed to co-operate with the shape of the alkaline hydrolysis unit in which it will be used. The container may have any desired colour and optionally may be coloured to imitate wood, for aesthetic appeal.

Alternatively, the coffin may comprise a flexible bag, instead of a substantially rigid container. If a bioplastic material is chosen, the bioplastic material could be a dissolvable starch based biopolymer, such as a "Mater-Bi™ thermoplastic biodegradable polymer" that comprises starch, polyesters and plasticizers. This material is available from Novamont SpA, Via Fauser, 8 I-28100, Novara, Italy. Such a bioplastic bag may be formed with very thin walls, whilst still being strong enough to carry a cadaver and still being waterproof. Alternatively, bags of silk or wool or other dissolvable materials could be used.

Typically, the bag is an open bag, or a closeable bag which can be opened, to allow the cadaver to be viewed.

Optionally, the bag may be closeable (e.g. by a zip) such that the dissolvable receptacle fully surrounds and encloses the cadaver. The zip also provides the tension required to form a "tent" type design that fully hides that cadaver.

Optionally, the coffin also includes a waterproof liner that is adapted to fit within or around the dissolvable receptacle.

The waterproof liner prevents body fluids from leaking out of the dissolvable receptacle.

The waterproof liner can comprise an open bag (to allow viewing of the cadaver), or a fully sealable, closed, bag. Embodiments comprising a closed bag can be used for cadavers which have an infectious disease.

Typically, the waterproof liner comprises a dissolvable starch based biopolymer material, for example a "Mater-Bi™ thermoplastic biodegradable polymer" comprising starch, polyesters and plasticizers.

The waterproof liner is typically sewn or otherwise attached to the dissolvable receptacle.

In alternative embodiments, the dissolvable receptacle is inherently waterproof (e.g. if the dissolvable receptacle is made from a bioplastic material), and a separate waterproof liner is not required.

Optionally, the coffin also includes a non-dissolvable mesh receptacle, which will still be intact at the end of the procedure. The mesh receptacle typically comprises a plastic mesh. The mesh receptacle typically comprises a bag. The mesh does not impede the flow of chemicals to the cadaver, which flow freely through the gaps in the mesh.

Preferably, the mesh of the non-dissolvable mesh receptacle is fine enough to retain substantially all of the bone residue of the cadaver (e.g. bone fragments, any body implants) within the non-dissolvable mesh receptacle. This allows the alkaline hydrolysis unit to be emptied and cleaned more rapidly, because the non-dissolvable mesh receptacle can simply be pulled out at the end, instead of having to pick up the bone residue scattered throughout the chamber of the alkaline hydrolysis unit.

The non-dissolvable mesh receptacle can be used with any coffin of the invention, whether silk or bioplastic, rigid or flexible.

The non-dissolvable mesh receptacle could be located inside or outside of the dissolvable receptacle.

The non-dissolvable mesh receptacle may be separate to the dissolvable receptacle.

Alternatively, the non-dissolvable mesh receptacle could be fixed to the dissolvable receptacle by any suitable means (e.g. lamination, bonding, adhesion, stitching, stapling).

Alternatively, the non-dissolvable mesh receptacle could be formed integrally with the dissolvable receptacle.

In all embodiments, the dissolvable receptacle will be dissolved in the alkaline hydrolysis process, leaving the non-dissolvable mesh receptacle retaining the bone residue.

According to a second aspect of the invention there is provided a coffin assembly comprising:
a coffin as claimed in any preceding claim; and
a support frame for supporting the coffin.

The support frame can provide the required rigidity for any flexible bag embodiments, and allows the coffin to be handled easily. The metal is chosen so as to be not decomposable in the alkaline hydrolysis unit, so the support frame can be re-used. Typically, the support frame is metal, for example, stainless steel.

Optionally, the coffin assembly also includes a head retaining means.

Preferably, the head retaining means is adapted to restrain vertical movement of a head of a cadaver.

Optionally, the head retaining means is adapted to restrain movement of a head of a cadaver in all directions.

Typically, the head retaining means comprises part of the support frame.

Alternatively, the head retaining means comprises a head strap.

Typically, the location of the head retaining means along the longitudinal axis of the coffin is adjustable, to suit cadavers of different heights. Optionally, the support frame has elongate slots, which secure the head strap to the frame and along which the head strap can be moved to adjust the longitudinal location of the head strap.

Preferably, the support frame comprises a stainless steel mesh.

Optionally, the support frame comprises a base and a plurality of posts that are attachable to the base.

Preferably, the base includes low friction feet.

Preferably, the low friction feet comprise wheels, rollers, runners or bearings, which allow the frame to be easily rolled or slid on a surface.

Preferably, the posts are removable from the base (e.g. by screw thread attachments).

Optionally, each post includes attachment means adapted to attach to corresponding attachment means provided on the dissolvable receptacle. Typically, the attachment means comprises at least one hook provided on each post, and an equal number of loops, each provided at a respective corresponding location on the dissolvable receptacle. Alternatively, the hooks could be provided on the dissolvable receptacle, and the loops on the posts. Further alternatively, entirely different attachment means could be provided, e.g. a hook and loop-type fastener (e.g. Velcro™) or a 3M™ Dual Lock™ fastening system.

Optionally, the base is generally rectangular and is provided with a rim on its two longitudinal sides. Optionally, the rim is also provided along one end.

According to a third aspect of the invention, there is provided a method of disposing of a cadaver, the method including the steps of:
placing the cadaver into a coffin comprising a dissolvable receptacle;
placing the coffin in an alkaline hydrolysis unit; and
adding water and a chemical into the alkaline hydrolysis unit with the cadaver, to break down the cadaver into a fluid component and a bone residue component and to dissolve the dissolvable receptacle of the coffin by alkaline hydrolysis.

Preferably, the chemical comprises potassium hydroxide. Alternatively, the chemical comprises sodium hydroxide.

Optionally, the coffin may include any of the features (optional or otherwise) of the first aspect of the invention.

Preferably, the method includes heating the inside of the alkaline hydrolysis unit, conserving at least some of the heat created, and using this heat to heat the alkaline hydrolysis unit when used for a subsequent cadaver.

Typically, the heat is conserved by transferring a heated fluid to an insulated heat tank.

Optionally, the heated fluid comprises water that has been used to cool the alkaline hydrolysis unit. Typically, this heated water is added into the alkaline hydrolysis unit when used for the next cadaver.

Alternatively, the heated fluid comprises waste fluid from the alkaline hydrolysis process. Typically, this heated waste fluid is used to heat mains water in the insulated tank, which will be added into the alkaline hydrolysis unit when used for the next cadaver.

According to a fourth aspect of the invention, there is provided an alkaline hydrolysis unit comprising:
a chamber for receiving a cadaver to be chemically decomposed by alkaline hydrolysis;
a mixing system adapted to recirculate fluids within the chamber;
wherein the mixing system is operable at temperatures up to 180 degrees centigrade.

Typically, the mixing system comprises a recirculation pump fluidly connected to the chamber of the alkaline hydrolysis unit. Typically, the recirculation pump comprises a seal-less stainless steel recirculating pump. The recirculation pump may be a magnetic drive recirculation pump.

Alternatively, the mixing system comprises a high temperature impeller mixing system.

According to a fifth aspect of the invention, there is provided an alkaline hydrolysis unit comprising:
- a chamber for receiving a cadaver to be chemically decomposed, the chamber including a head-receiving part, intended to receive the head of the cadaver;
- a recirculation pump fluidly connected to the chamber of the alkaline hydrolysis unit and adapted to recirculate fluids within the chamber;
- a head retaining means locatable in the chamber, for retaining the head of the cadaver in the head-receiving part of the chamber; and
- at least one recirculation jet fluidly connected to the recirculation pump and positioned to aim fluid from the recirculation pump at the head-receiving part of the chamber.

Aiming the recirculated fluid at the head of the cadaver helps to ensure that the head fully decomposes. The skull is very good at protecting the brain tissue from chemical attack, and there are only a few entry places from which the chemicals can penetrate, e.g. the nose and the eye sockets. Aiming the fluid directly at the head can considerably reduce the time needed to dissolve a cadaver, e.g. from 7-8 hours to 2-3 hours.

The head retaining means prevents the head from floating on the surface of the fluids in the chamber, should the head become detached from the rest of the cadaver.

The jet may optionally project into the chamber, in close proximity to the the head-receiving part of the chamber.

Optionally, the alkaline hydrolysis unit includes a support frame, and the head retaining means comprises part of the support frame. Optionally, the head retaining means comprises a tunnel, adapted to at least partially surround a head of a cadaver. Optionally, the head-receiving part of the chamber is bounded by an underside of the tunnel, the recirculation jet and an end of the chamber. Optionally, the tunnel includes an aperture in a wall thereof which, when the support frame is correctly positioned in the chamber, is aligned with the recirculation jet.

Alternatively, the head retaining means comprises a strap.

Preferably, the head retaining means is adapted to restrain vertical movement of a head of a cadaver in the chamber. Optionally, the head retaining means is adapted to restrain movement of a head of a cadaver in all directions.

Optionally, the location of the head retaining means is adjustable relative to the longitudinal axis of the chamber.

Optionally, the alkaline hydrolysis unit is adapted for use with a coffin, insertable within the chamber, and which has a profile shaped to co-operate with the inner profile of the chamber when the coffin is inserted in a correct orientation (e.g. head first), and shaped not to co-operate with the inner profile of the chamber when the coffin is inserted in the opposite, incorrect orientation (e.g. feet first), thereby preventing entry of the coffin into the chamber in the incorrect orientation. Optionally, the recirculation jet may form part of the co-operating inner profile of the chamber.

According to a sixth aspect of the invention, there is provided a system for disposing of a cadaver, the system comprising:
- an alkaline hydrolysis unit;
- an insulated water tank; and
- a heat exchange means for heating water stored in the insulated water tank using heat from the alkaline hydrolysis unit.

Typically, the heat exchange means includes a conduit for conveying water through a body of fluid in the alkaline hydrolysis unit, or for conveying fluid from the alkaline hydrolysis unit through a body of water.

Optionally, the heat exchange takes place in the alkaline hydrolysis unit, e.g. the heat exchange means can comprise a heating/cooling tube located within the alkaline hydrolysis unit. In such embodiments, heated water from the heating/cooling tube can be conveyed through a conduit into the insulated tank. The heated water can be stored in the insulated tank until the alkaline hydrolysis unit has received the next cadaver, at which point the heated water can be conveyed from the insulated tank back into the alkaline hydrolysis unit.

Alternatively, the heat exchange takes place in the insulated tank. For example, the insulated tank can comprise a heat exchanger.

In such cases, the heat exchange means typically comprises a steel coil heat exchanger, which includes a chamber and a steel conduit (e.g. a coil) located within the chamber.

In such embodiments, mains water can be provided in the chamber, and hot waste fluids from the alkaline hydrolysis unit can be conveyed through the steel conduit. The hot waste fluids heat the water in the chamber as they pass through the steel conduit. The heated mains water is stored in the insulated tank, and when the alkaline hydrolysis unit has received the next cadaver, the heated water can be conveyed from the insulated tank back into the alkaline hydrolysis unit.

Re-filling the alkaline hydrolysis unit with water from the insulated tank that is already hot reduces the energy needed in reheating the alkaline hydrolysis unit, and reduces the time required to decompose the next cadaver.

Typically, the system also includes a steam generator, connected to the alkaline hydrolysis unit and adapted to heat the alkaline hydrolysis unit.

Typically, the system also includes a chemical storage unit, which is optionally connectable to the alkaline hydrolysis unit.

Optionally, the system also includes a flash tank, into which waste fluids from the alkaline hydrolysis unit are conveyed, prior to disposal.

According to a seventh aspect of the invention, there is provided a method of disposing of a cadaver, the method including the steps of:
- placing the cadaver in an alkaline hydrolysis unit;
- adding water and a chemical into the alkaline hydrolysis unit with the cadaver and heating the inside of the alkaline hydrolysis unit, to break down the cadaver by an alkaline hydrolysis process into a fluid component and a bone residue component;
- conserving at least some of the heat created; and
- using this heat to heat the alkaline hydrolysis unit when used for a subsequent cadaver.

Preferably, the chemical comprises potassium hydroxide. Alternatively, the chemical comprises sodium hydroxide.

Typically, the heat is conserved by transferring a heated fluid to an insulated heat tank.

Optionally, the heated fluid comprises water that has been used to cool the alkaline hydrolysis unit. Typically, this heated water is added into the alkaline hydrolysis unit when used for the next cadaver.

Alternatively, the heated fluid comprises waste fluid from the alkaline hydrolysis process. Typically, this heated waste fluid is used to heat mains water, which will be added into the alkaline hydrolysis unit when used for the next cadaver.

According to an eighth aspect of the present invention, there is provided a method of disposing of a cadaver, the method including the steps of:

connecting a recirculation pump to a chamber of an alkaline hydrolysis unit;

connecting a recirculation jet to the recirculation pump, and aiming the recirculation jet at a head-receiving part of the chamber;

placing the cadaver into the chamber so that the head of the cadaver is located in the head-receiving part of the chamber and the recirculation jet is aimed at the head;

using a head retaining means to retain the head of the cadaver in the head-receiving part of the chamber;

filling the chamber with a mixture of a chemical and water; and activating the recirculation pump to aim recirculated fluid, via the recirculation jet, at the head of the cadaver, thereby breaking down the cadaver into a fluid component and a bone residue component by alkaline hydrolysis.

Optionally, the head retaining means is part of a support frame, and wherein the method includes the step of inserting the head of the cadaver into that part of the support frame.

Alternatively, the head retaining means comprises a strap that is attachable to a support frame, and wherein the method includes the step of using the strap to fix the head of the cadaver to the support frame.

Optionally, the method includes the steps of:

heating the inside of the alkaline hydrolysis unit;

conserving at least some of the heat created; and using this heat to heat the alkaline hydrolysis unit when used for a subsequent cadaver.

An embodiment of the invention will now be described, by way of example only, and with reference to the following drawings, in which:

FIGS. 12a, 12b and 12c show plan, side and end views respectively of the bone retaining tray of FIGS. 11a, 11b and 11c, and a coffin of another embodiment of the invention loaded on the tray;

Figure 1:
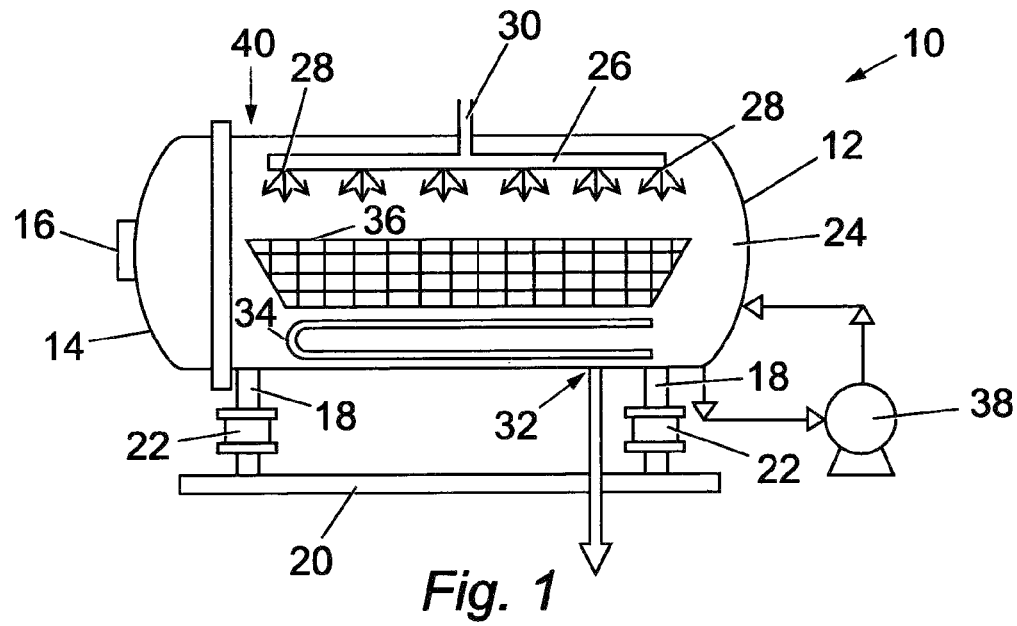
FIG. 1 shows a schematic diagram of an alkaline hydrolysis unit of the invention.
Figure 2:
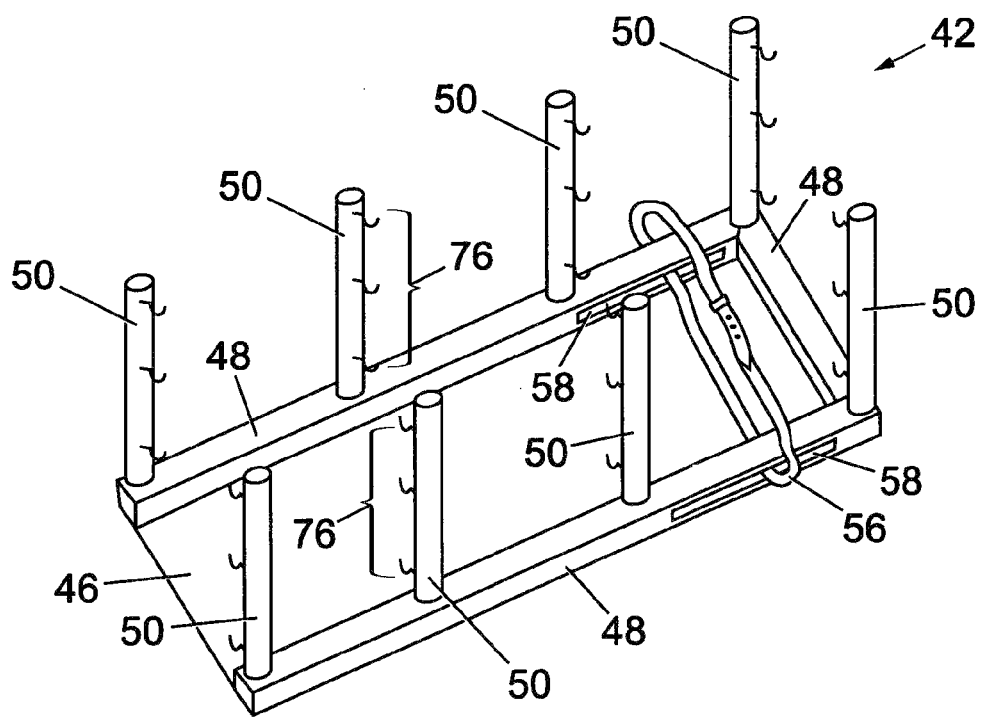
FIG. 2 shows a perspective view of a metal frame used with a coffin according to one embodiment of the invention.
Figure 3:
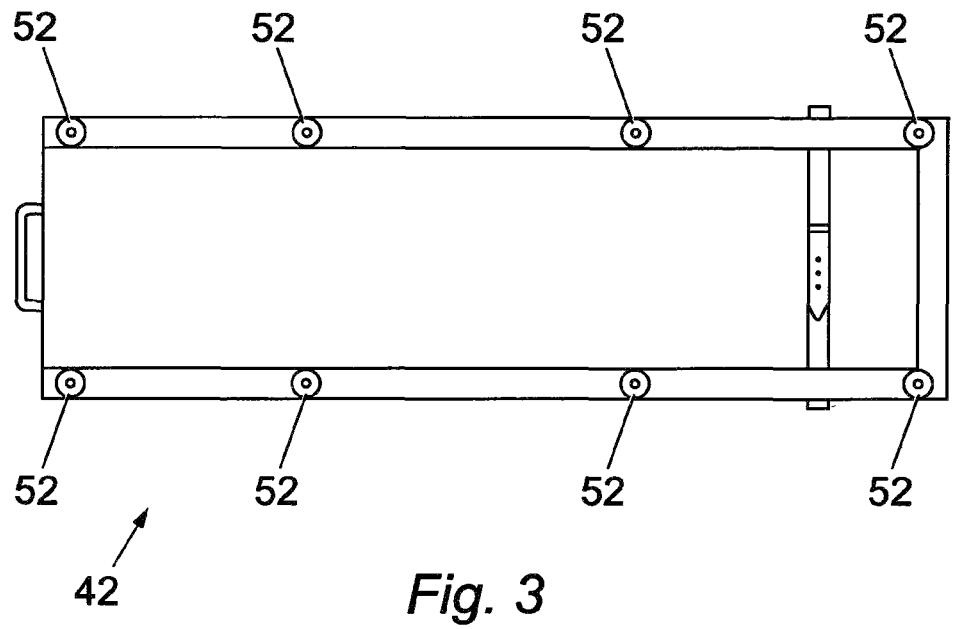
FIG. 3 shows a plan view of the base of the FIG. 2 frame.
Figure 4:
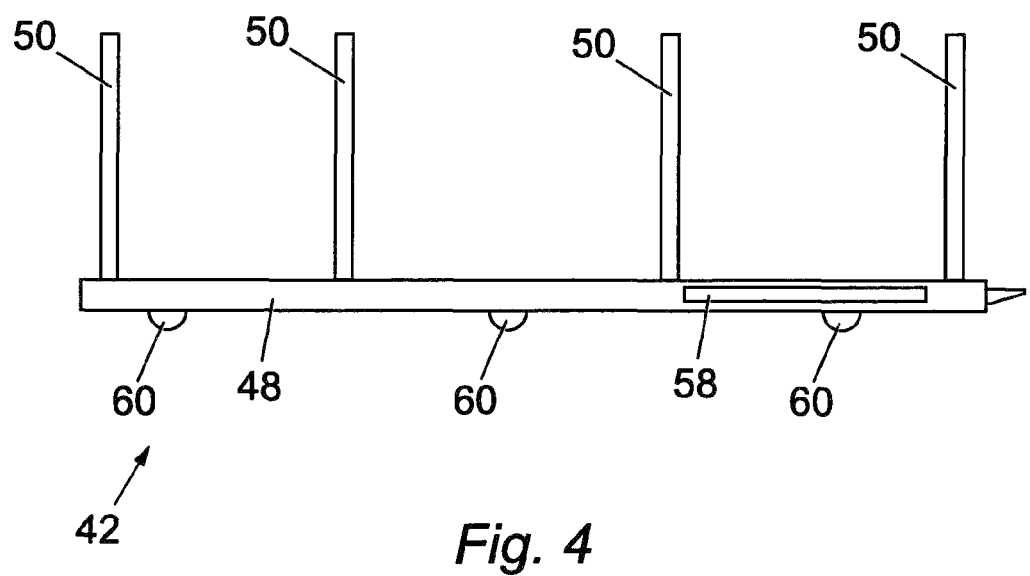
FIG. 4 shows a side view of the FIG. 2 frame.

Referring now to FIG. 1, this shows an alkaline hydrolysis unit 10 comprising a stainless steel pressure vessel 12. The pressure vessel 12 is a 304L/316L vessel and is rated to achieve up to 180 degrees centigrade working temperature. The pressure vessel 12 has a stainless steel door 14 with a handle 16. The door 14 can be manually latched or have an automated (hydraulic) latching alternative. The alkaline hydrolysis unit 10 is clad in 304 stainless steel shroud on all sides with easy removable panels (not shown).

The pressure vessel 12 is skid mounted, i.e. the pressure vessel 12 has legs 18 and a skid 20. The legs 18 are provided with lifting brackets 22.

The pressure vessel is hollow and defines a chamber 24 within the pressure vessel 12. Inside the chamber 24 is a spray bar 26, which is mounted in an upper part of the chamber 24. The spray bar 26 is elongate and has nozzles 28 distributed along its length. The spray bar 26 has a water inlet 30.

At the bottom of the chamber 24, at the end of the chamber 24 farthest from the door 14, is a drain 32 in the form of an aperture in the chamber 24. The drain 32 is attached to an outlet conduit (shown schematically by an arrow). The location of the drain far away from the door 14 enables easy rinsing.

Also in the chamber 24 is a hollow heating/cooling tube 34. As will be explained with reference to FIGS. 9 and 10, the heating/cooling tube 34 is attached at both ends to a conduit system. Either hot water, hot steam, or cold water can be passed through the heating/cooling tube 34, to regulate the temperature of the chamber 24, as required.

Optionally, the chamber 24 includes a stainless steel basket 36, sized to contain a cadaver. The sides and base of the basket 36 are formed from a steel mesh. One end of the basket 36 has a hinged end to allow folding down. The basket 36 typically has PTFE slide strips on both sides to enable easy transfer of the basket 36 into the chamber 24.

Optionally, the cadaver can be placed directly in the basket 36. In alternative embodiments (described with reference to FIGS. 2 to 8), the basket 36 is not always required, as these Figures show a coffin that can be directly located inside the chamber 24, without the need for placement within a basket 36. In some other embodiments, the hinged end of the basket 36 is folded down, and the coffin of FIGS. 2 to 8 is rolled into the basket 36.

Fluidly connected to the chamber 24 is a seal-less high temperature stainless steel recirculating pump 38. The pump 38 has an operating temperature up to 180 degrees centigrade. The recirculation pump 38 is adapted to recirculate fluids within the chamber 24.

Also in the chamber 24, are one or more jets (not shown) fluidly connected to the recirculation pump 38 and positioned to aim fluid from the recirculation pump 38 at the part of the chamber 24 of the alkaline hydrolysis unit 10 intended to receive the head of the cadaver. The jets are positioned so that they aim fluid from different directions.

Optionally, a head retaining means (e.g. a strap) may be provided as a component of the chamber 24.

The chamber 24 is provided with integral load cells (not shown), to weigh a cadaver placed in the chamber 24. The pressure vessel 12 also has a control system (not shown) comprising a touch screen and boxed in stainless steel for wall mounting. The control system includes software for automated weighing of the cadaver and for calculating, based on the weight, the chemical/water mix concentration that will be optimum for that particular cadaver. The pressure vessel 12 has an integral modem, or other communication means, for remote interrogation.

The chamber 24 also has a chemical inlet 40, by way of which chemicals for the alkaline hydrolysis process can be introduced into the chamber 24.

Figure 5:
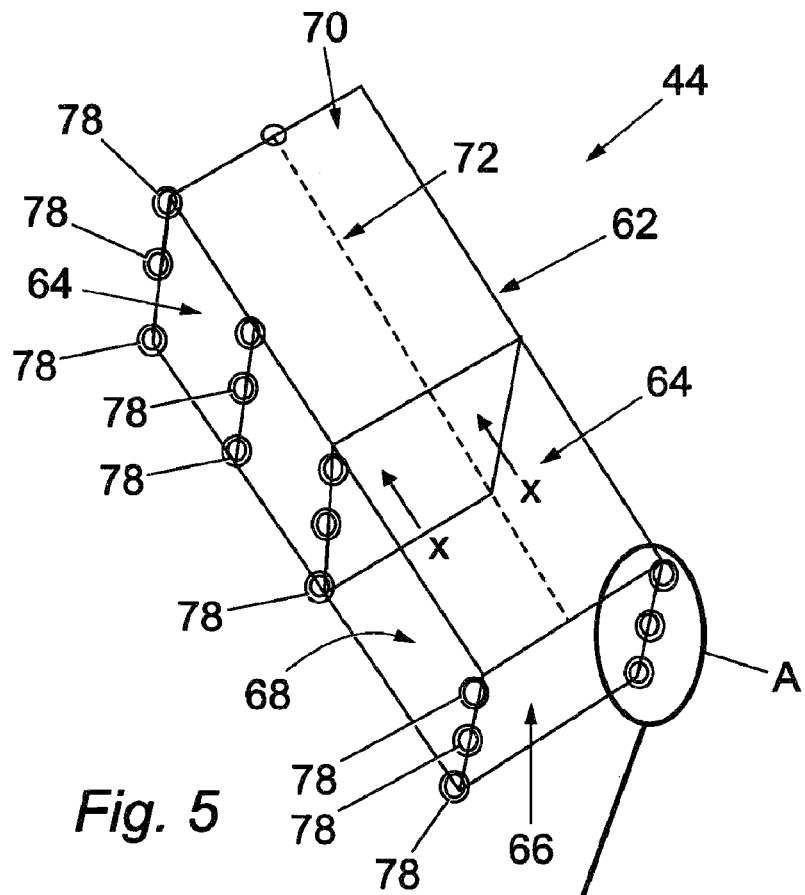
FIG. 5 shows a perspective view of a dissolvable receptacle of the coffin.
Figure 6:
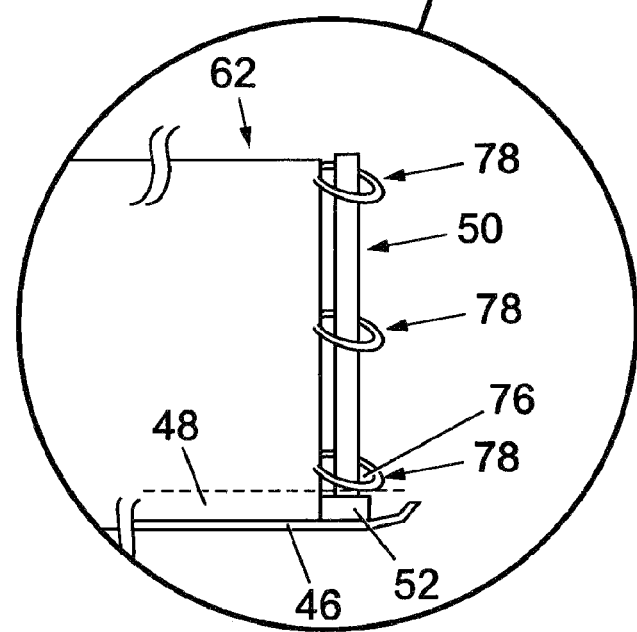
FIG. 6 shows a detail A of FIG. 5 and in particular shows the attachment of the dissolvable receptacle to the metal frame.
Figure 7:
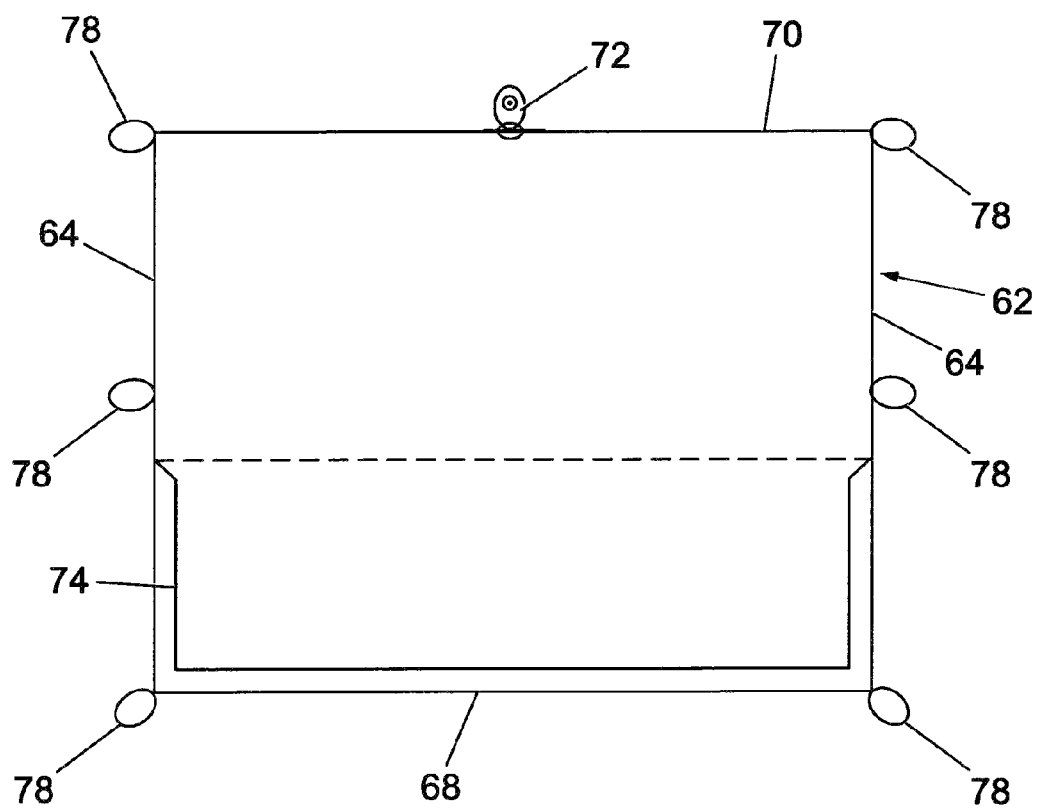
FIG. 7 shows a sectional view of the dissolvable receptacle, taken along the line X-X in FIG. 5.
Figure 8:
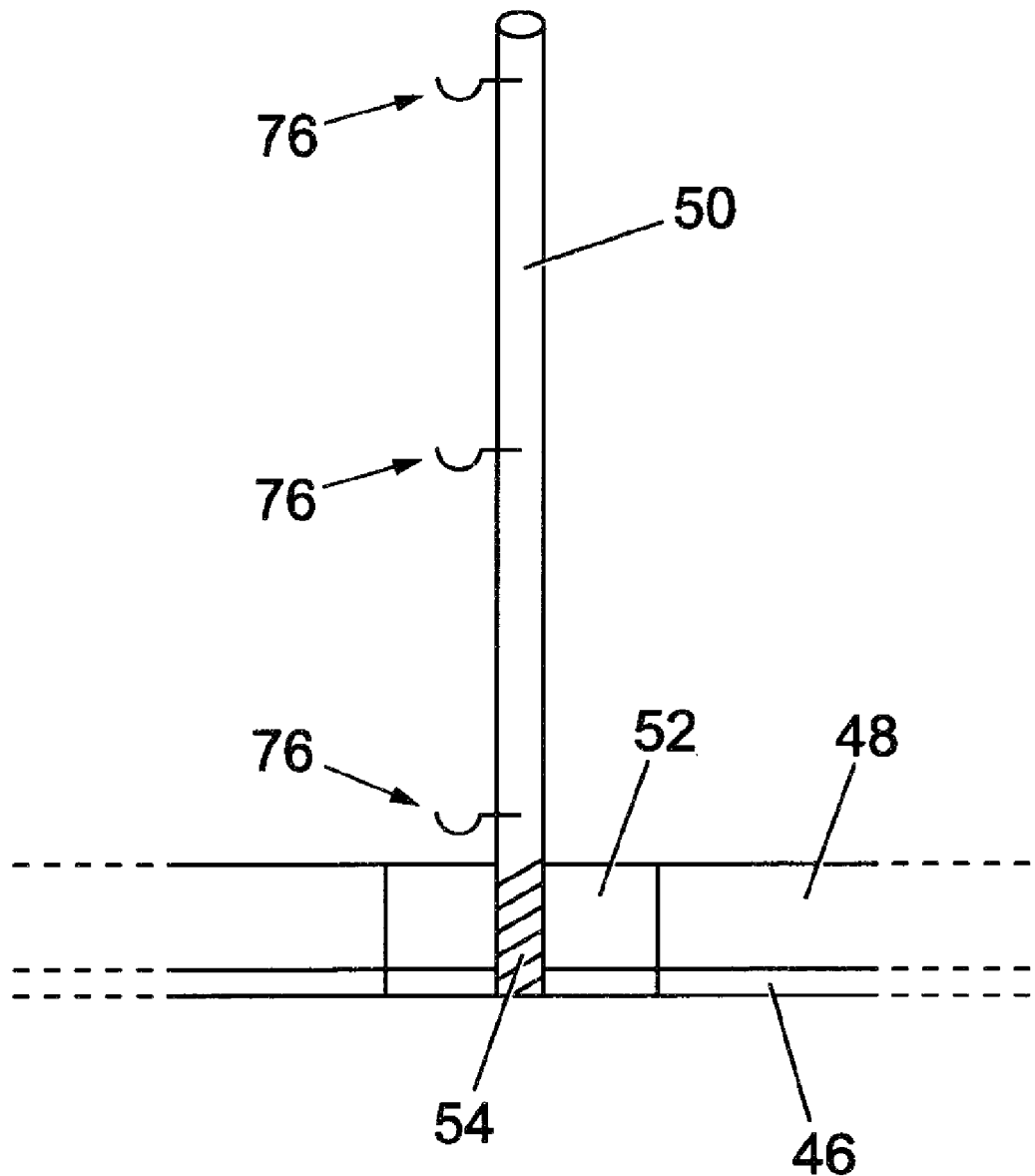
FIG. 8 shows an enlarged view of a post of the FIG. 2 frame, engaged in a receptacle in the base of the frame.

Referring now to FIGS. 5 to 7, there is shown a coffin for use in an alkaline hydrolysis process. The coffin comprises a dissolvable receptacle 44 for receiving a cadaver. The dissolvable receptacle 44 may be a cloth receptacle.

The dissolvable receptacle 44 is supported by a metal support frame 42, which may be of stainless steel (see FIGS. 2 to 4 and 8). The frame 42 includes a base 46, which is a rectangular planar member that comprises a stainless steel mesh. The mesh has holes of around 5 mm in diameter.

The base 46 has a rim 48 on its two longitudinal sides and at one end. The rim 48 has a dimension of approximately 20-40 mm. Eight posts 50 are attachable to the base 46, four of the posts 50 being located along each longitudinal side rim 48, at approximately equally spaced intervals. The posts 50 are removable from the base 46 and engage in welded female push fittings 52, which are built into the rims 48 (see FIGS. 3 and 8). The lower ends of the posts 50 are formed with respective corresponding male push fittings 54, e.g. beveled push fittings. In alternative embodiments, the female and male push fittings 52, 54 can be replaced by a screw-threaded connection.

The frame 42 includes a head retaining means, which comprises a head strap 56 which engages in two slots 58. One slot 58 is provided in the rim 48 on each opposite longitudinal side of the frame 42. The slots 58 extend all the way through the rims 48, in a plane parallel to the plane of the base 42.

The head strap 56 can be moved along the length of the slots 58, to suit cadavers of different heights. In this way, the location of the head retaining means is adjustable along the longitudinal axis of the coffin.

Low friction feet, in the form of six stainless steel castors (wheels) 60 are provided on the underneath side of the base 42. These allow the frame 42 to be easily rolled on a surface.

Turning now to FIGS. 5 to 7, the dissolvable receptacle 44 comprises a bag 62. The bag 62 is generally box shaped (cuboid), and sized to be slightly smaller than the frame 42, when held under light tension. The bag 62 has two longitudinal side panels 64, two end panels 66, a base panel 68 and a top panel 70, each of which are rectangular, to form the cuboid shape. The top panel 70 is formed from two halves, split longitudinally, each of the halves being attached to its nearest side panel 64. The two halves of the top panel 70 are connectable by a zip 72. The zip 72 can be closed to tension the top panel 70, or opened to allow a cadaver inside the bag 62 to be viewed. Other fastening means may be used instead of a zip, for example hook and loop fasteners, and the fasteners may be positioned to the side rather than in the centre of the top panel 70.

In this embodiment, the dissolvable receptacle 44 is formed from silk. In alternative embodiments, the dissolvable receptacle 44 may comprise (alternatively or additionally) wool or a dissolvable starch based biopolymer. Alternatively, the dissolvable receptacle can be made from any suitable material which is dissolvable in an alkaline hydrolysis process.

The coffin also includes a waterproof liner 74 that is adapted to fit within the bag 62, and which is sewn into the inside of the bag 62. As shown in FIG. 7, the waterproof liner 74 is sewn into the lower part of the bag 62, and fits quite snugly in the base of the bag 62.

The waterproof liner 74 prevents body fluids from leaking out of the receptacle 44.

The waterproof liner 74 can comprise an open bag (to allow viewing of the cadaver), or a fully sealable, closed, bag. Embodiments comprising a closed bag can be used for cadavers which have an infectious disease.

The waterproof liner 74 comprises a starch based biopolymer material.

In alternative embodiments, the dissolvable receptacle 44 is inherently waterproof (e.g. if the receptacle 44 is made from a dissolvable starch based biopolymer), and a separate waterproof liner 74 is not required.

The receptacle 44 can be attached to the frame 42 by means of hooks 76 provided on the posts 50 of the frame 42, which engage with corresponding silk loops 78 provided on the longitudinal side panels 64 of the bag 62.

Hence, the hooks 76 and the loops 78 comprise attachment means of the receptacle 44 and the frame 42.

Each post 50 is provided with three hooks 76, one at the top, the middle and the bottom end of the post 50.

The coffin is provided with an outer casing (not shown), which resembles a conventional, wooden coffin, for presentation to the public. The outer casing comprises a plurality of wooden panels sized to at least partially surround the coffin.

In use, a coffin assembly (the coffin and the frame) is created, with the posts 50 being located in the female push fittings 52 of the frame 42. The dissolvable receptacle 44 (and integral waterproof liner 74) is placed into the assembled frame 42, and the loops 78 are located over the hooks 76, so that the dissolvable receptacle 44 is supported by the frame 42. (In embodiments where the waterproof liner 74 is used but is not integral with the receptacle 44, the waterproof liner 74 can be positioned in the receptacle 44 and optionally secured thereto.)

The coffin assembly is rigid, so it can be easily handled by the crematorium operators.

The outer casing is now placed around the coffin assembly (or the coffin assembly is placed inside the outer casing).

The zip 72 is unzipped and a cadaver is placed in the receptacle 44.

Now, the cadaver is ready for presentation at the funeral ceremony (if required), with the zip 72 optionally being left open so that the cadaver can be viewed at the ceremony. The mourners see the outer casing, which resembles a conventional coffin, and the cadaver lying inside a silk lining of the coffin assembly.

Alternatively, if the zip 72 is closed, the cadaver is fully hidden from view, and the shape of the cadaver is not shown (in contrast to a shroud).

Alternatively, if the cadaver has a contagious disease, a fully sealed waterproof liner 74 could be used instead of an open waterproof liner 74, in which case the cadaver is also hidden from view.

After the funeral ceremony, the coffin disappears from public view and can be now prepared for the alkaline hydrolysis process. First, the ends of the outer casing are folded down, and the coffin assembly is removed from the outer casing. The outer casing can now flat packed down, and can be sent back to the funeral directors, optionally with a frame 42 from the previous alkaline hydrolysis process.

The head strap 56 is now secured to fix the head of the cadaver to the metal frame 42.

The door 14 of the pressure vessel 12 is opened, and the coffin assembly can now be rolled, using the castors 60, into the chamber 24 of the alkaline hydrolysis unit 10. As described above, the coffin assembly can either be located in the basket 36, or the coffin assembly can be used instead of the basket 36.

The door 14 is now locked. The integral load cells weigh the cadaver, and the control system calculates, based on the weight, the chemical/water mix concentration that will be optimum for that particular cadaver. The aim is to achieve a starting concentration of around 1-1.5 Molar (pH 12-14) Hydroxide solution. (Alternatively, the weighing and the calculations may be done manually).

Chemicals and water are then added into the chamber 24 in that concentration, via the chemical inlet 40 and the water inlet 30 and spray bar 26, until the chamber 24 is slightly more than half full. In this example, the chemical used is potassium hydroxide, but alternatively, sodium hydroxide could be used. Potassium hydroxide is preferred because it is more eco-friendly.

Steam from a steam generator is now passed through the heating/cooling tube 34. Alternatively, or additionally, steam can be directly injected into the chamber 24. The chemical/water mix in the chamber 24 is heated by the steam to a temperature of 150-180 degrees centigrade, and the pressure in the chamber 24 rises to 3-10 bar gauge.

After the temperature has risen the required amount, this temperature is maintained for a certain "holding" time, to enable the chemicals to act on the cadaver to decompose the cadaver.

During the heating process and the subsequent "holding" time, the recirculation pump 38 is used to rapidly recirculate the fluids inside the chamber 24. This ensures a consistently homogeneous solution.

The jets that are fluidly connected to the recirculation pump aim the recirculated fluid at the head of the cadaver. This helps to provide good chemical availability at the brain tissue area, which is important to ensure that the brain tissue fully decomposes. Optionally, the jets project into the chamber 24 and the outlet ports thereof may be positioned in close proximity to the head of the cadaver. The head strap 56 stops the head from floating around the chamber 24, if it breaks off from the neck. This ensures delivery of the chemicals forcefully and directly to the head.

After the required holding time (which may be 2-3 hours), the cadaver should have been fully decomposed. The alkaline hydrolysis process can be explained with reference to the natural process of decomposition of cadavers. In alkaline soil, a shallow burial of a body with oxygen available would result in a slow decomposition of tissues via alkaline hydrolysis and expedited by bacteria.

In the alkaline hydrolysis unit 10, the cadaver decomposes in an alkaline solution, similar to how it would decompose in nature, but more quickly. Specifically, the cadaver is "resolved" into its constituent elements.

Principally, the cadaver is broken down into calcium phosphate bone and teeth remains (hereinafter referred to as "bone shadows"); and organic material in fluid form.

In the alkaline hydrolysis process, the receptacle 44 and the waterproof liner 74 have been fully decomposed, along with the cadaver and any clothing.

The metal frame 42 has not decomposed, because the metal chosen for the frame 42 is not dissolvable. Hence, what is now left in the chamber 24 is (a) the metal frame 42, (b) bone shadows lying on the base 46 of the frame 42, and (c) a homogeneous waste fluid including the organic material from the cadaver, and any dissolved remains of the receptacle 44, the waterproof liner 74 and any clothing worn by the cadaver.

Next, cooling water is now passed through the heating/cooling tube 34, to cool the waste fluid down to a temperature at which it can be accepted by the local drainage system.

During this process, the "cooling" water used to cool the chamber 34 becomes hot. Some of this hot water can be collected, for later use (see below).

Once the waste fluid in the chamber 24 reaches the desired lower temperature, it leaves the chamber 24 via drain 32, and can be dumped into the local drainage system, or an effluent tank, as required. Optionally, the waste fluid leaving the chamber 24 is delivered into a flash dump cooling tank. This reduces the amount of time the waste fluid has to spend in the chamber 24, being cooled, which speeds up the cycle time—i.e. the alkaline hydrolysis unit 10 will be ready quicker for the next cadaver.

It should be noted that no vacuum is applied to the pressure vessel 12, and any venting of the chamber 24 is via the drain 32.

After the waste fluid has been drained, the bone shadows are removed from the chamber 24 via the door 14 (note, there is no rim 48 on the end of the frame 42 nearest the door 14, which facilitates the removal of the bone shadows).

The collected hot water (formerly the cooling water) can now be used to hot rinse the bone shadows. Some surfactant detergent can also be added, to wash residual fatty deposits from the bone shadows. The bone shadows are then dried and crushed, and can be presented to the relatives (as is done with the ashes, after a cremation).

The frame 42 is now removed from the chamber 24. The posts 50 can be removed from the base 46 of the frame 42, to enable easy and light transportation of the frame 42 back to the funeral directors, together with the flat packed outer casing for the next coffin to be processed.

Figure 9:
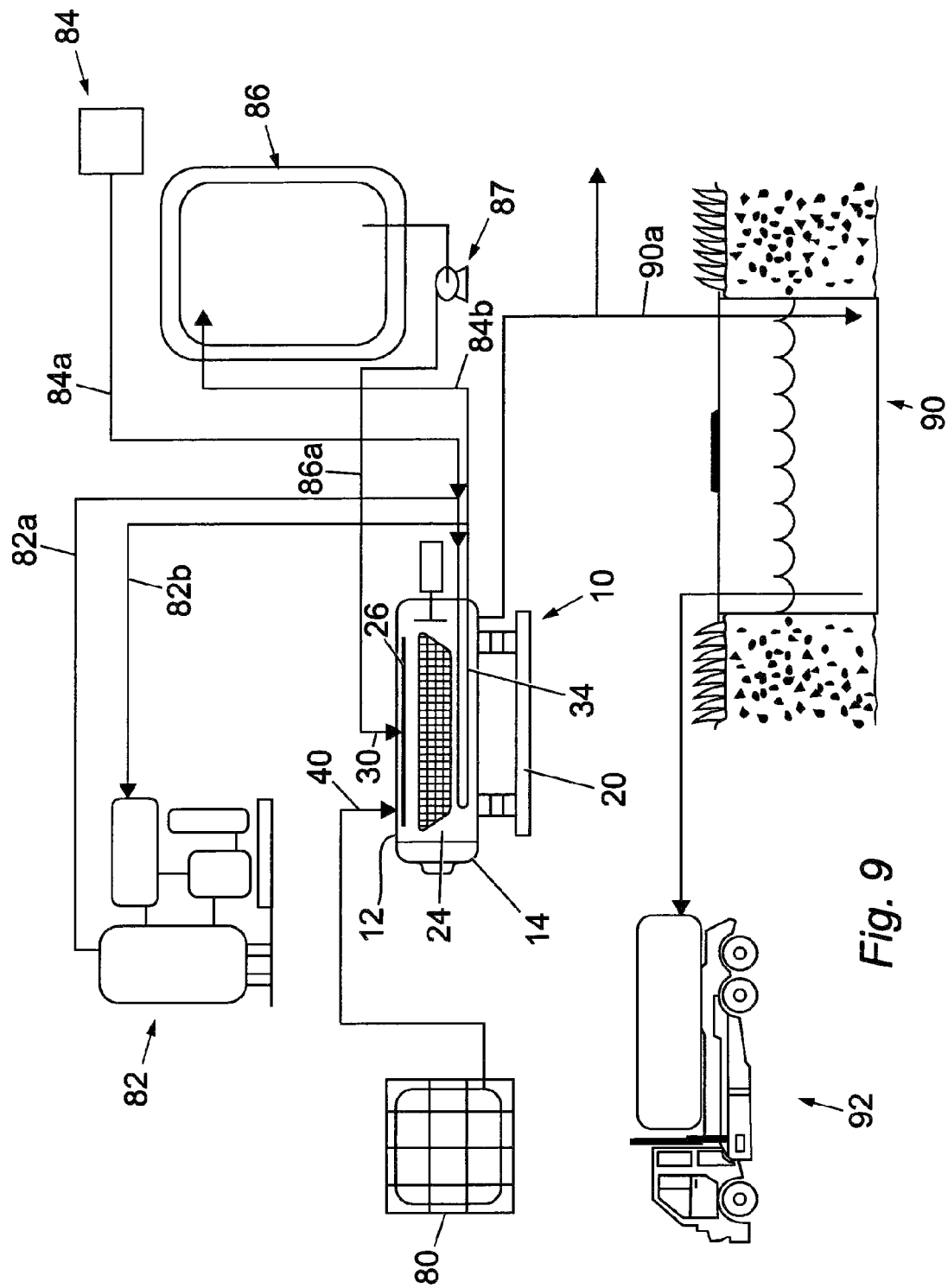
FIG. 9 shows a schematic diagram of a first overall system for disposing of human remains using an alkaline hydrolysis process.

One embodiment of an overall system used in the alkaline hydrolysis process can be seen in FIG. 9. FIG. 9 will now be used to explain in more detail some aspects of the alkaline hydrolysis process described above.

The alkaline hydrolysis unit 10 of FIG. 1 is shown in the centre. To the left hand side, is shown a store of potassium hydroxide 80, to be added to the chamber 12 via chemical inlet 40.

At the top, is shown a steam generator 82, which has conduits 82a, 82b that are fluidly connectable to the heating/cooling tube 34. In this way, in the heating stage, the steam to heat the chamber 12 is generated by the steam generator 82, flows through conduit 82a into the heating/cooling tube 34, and is returned to the steam generator via conduit 82b.

A mains water supply 84 is also fluidly connectable to the heating/cooling tube 34, via a water conduit 84a. In the cooling stage, the water conduit 84a is connected to the heating/cooling tube 34, and mains water flows therethrough. In the heating/cooling tube 34, heat is transferred from the chamber 24 into the water flowing through the heating/cooling tube 34, so that the chamber 24 becomes cooler and the cooling water becomes hot.

The heated mains water leaves the heating/cooling tube 34 via a further water conduit 84b, which leads into the inlet of an insulated stainless steel hot water tank 86. This hot water can now be stored in the tank 86 until the next cadaver is ready to be processed in the alkaline hydrolysis unit 10.

When the next cadaver is ready to be processed, hot water is fed from the hot water tank 86, via conduit 86a, into the water inlet 30 and the spray bar 26. Thus, the water that is delivered into the chamber 24 on the subsequent cycle is already hot. This saves a lot of energy, as compared to filling the chamber 24 with cold water, and heating this water. Furthermore, the feed water already being hot also drastically reduces the heating time of the subsequent cycle. Also, as explained above, some of the water from the hot water tank 86 can be used to hot rinse the bone shadows.

A centrifugal pump 87 is located in the conduit 86*a*, to pump the water back to the water inlet 30. The pump 87 enables rapid refilling and powerful rinsing.

At the bottom of FIG. 9 is shown an underground effluent tank 90. At the end of the process, once the waste fluids have been sufficiently cooled, a conduit 90*a* takes the waste fluids from the outlet 32 to the effluent tank 90. Optionally, the rinse water can be diverted to a sewer.

The waste fluids could optionally then be taken offsite, in a tanker 92, for conversion to a soil improver.

Figure 10:
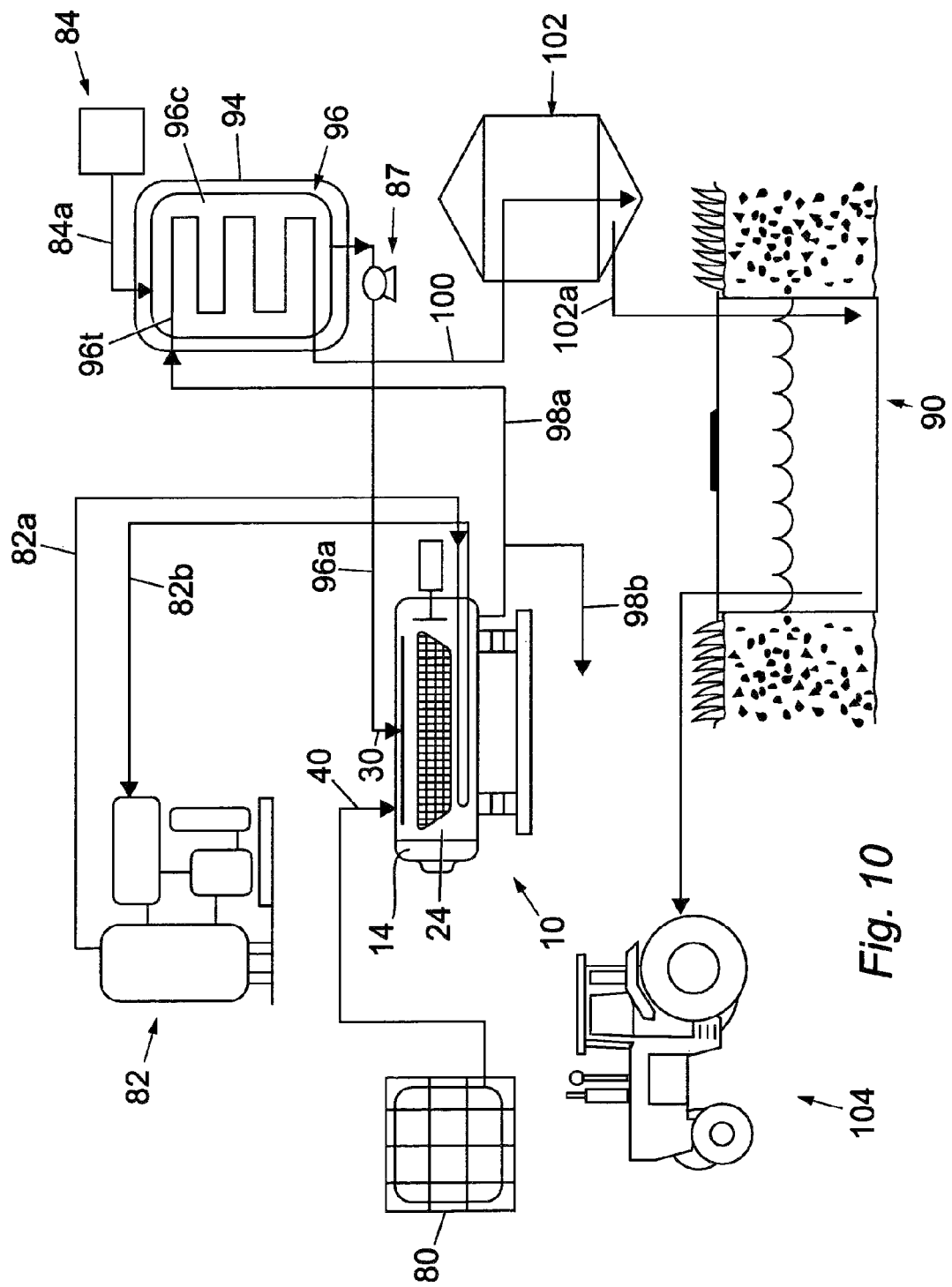
FIG. 10 shows a schematic diagram of a second overall system for disposing of human remains using an alkaline hydrolysis process.

FIG. 10 shows an alternative embodiment of the overall system of FIG. 9. This system is very similar to that shown in FIG. 9, and like parts are designated with like reference numbers.

The steam generator 82 and process of heating the chamber 24 is exactly the same as in FIG. 9. However, the process of cooling the chamber 24 is different.

In FIG. 10, water from the mains supply 84 is delivered directly into an insulated stainless steel hot water tank 94 via the conduit 84*a*. The hot water tank 94 comprises a steel coil heat exchanger 96. The heat exchanger 96 includes a main chamber 96*c* (into which the mains water is delivered) and a steel conduit 96*t* located within the main chamber 96*c*. The steel conduit 96*t* is formed into a coil.

The drain 32 of the pressure vessel 12 is fluidly connected via conduit 98*a* to an inlet of the steel conduit 96*t*. An optional branch conduit 98*b* of the conduit 98*a* can take rinse water directly to a sewer.

In such systems, the waste fluids do not necessarily have to be cooled (or at least, not cooled to such a great extent) in the pressure vessel 12, because they are drained out through conduit 98*a*, and into the steel conduit 96*t*. In the conduit 96*t*, the hot waste fluids transfer heat through the walls of the conduit 96*t* to the mains water stored in the chamber 96*c*. In this process, the waste fluids become cooler, and the mains water is heated.

The outlet of the conduit 96*t* is connected via a conduit 100 to a flash tank 102, in which pressure is relieved and the waste fluids are cooled further.

The outlet of the flash tank 102 is connected via a conduit 102*a* to the underground effluent tank 90. The waste fluids can then be taken offsite (as described with reference to FIG. 9) or they can be taken (e.g. by a tractor 104) to be used onsite as a soil improver. Of course, the waste fluids in FIG. 9 could also be used onsite as a soil improver.

Turning back to the hot water tank 94, when the next cadaver is ready to be processed in the alkaline hydrolysis unit 10, water from an outlet of the chamber 96*c* is fed via a conduit 96*a* into the water inlet 30 and spray bar 26 of the alkaline hydrolysis unit 10. Therefore, the water used to fill the chamber 24 is already hot, which greatly reduces the energy needed to heat the chamber 24, and the heating time required, as with the FIG. 9 system.

As an example only, the volume of each of the hot water tanks 86, 94 is around 1,500 liters.

The effluent tank 90 can be plastic (e.g. MDPE) and located underground to allow drainage of the waste fluids to the effluent tank 90 under gravity.

Preferred embodiments of the invention enable a cycle time of only 2 to 2.5 hours of the cadaver being in the alkaline hydrolysis unit 10.

Figure 11A:
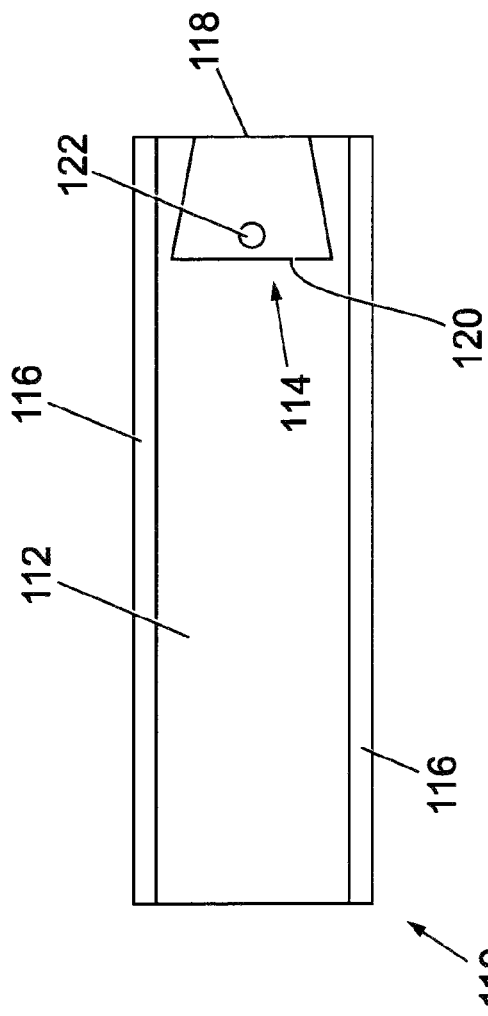
FIGS. 11a, 11b and 11c show plan, side and end views respectively of a bone retaining tray.
Figure 11B:
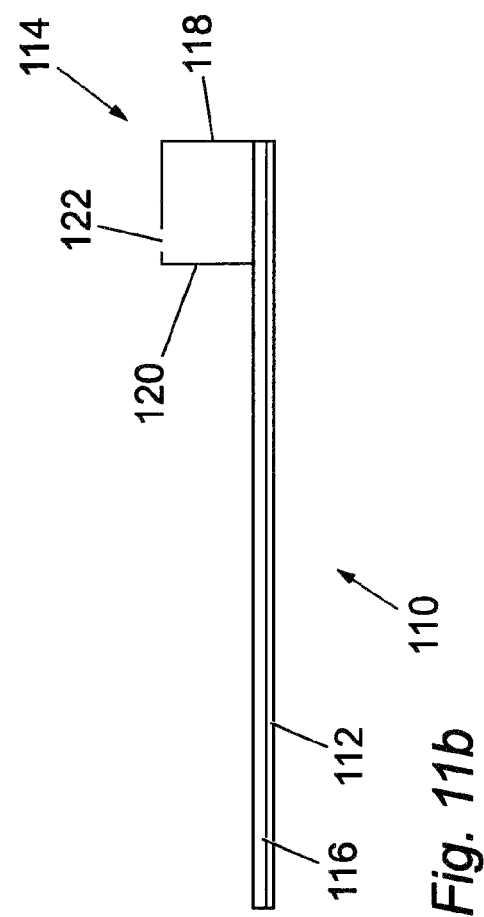
Figure 11C:
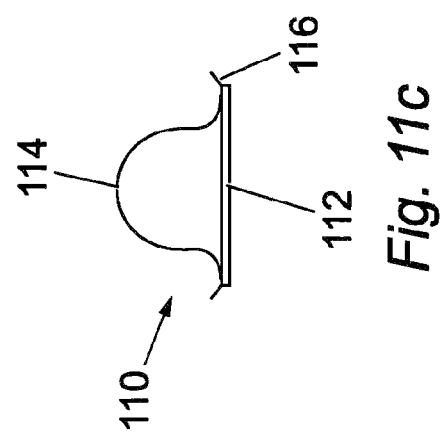

FIGS. 11*a*, 11*b* and 11*c* show an alternative support frame in the form of a bone retaining tray 110. The bone retaining tray 110 is an alternative to the basket 36 shown in FIG. 1.

The bone retaining tray 110 comprises a coffin-receiving flat tray member 112 and a head-retaining means 114, both of which are typically stainless steel perforated mesh. The tray member 112 has approximately the same length and width as a coffin and is substantially flat, except that its two longitudinal edges are inclined upwards at around 30 degrees. These upwardly inclined edges form rails 116, which are provided with Polytetraflouroethylene (PTFE) runners to allow the tray 110 to be easily inserted into, and removed from, the alkaline hydrolysis unit 10. The rails 116 may be formed integrally with the rest of the flat tray member 112, or may be formed separately and fixed thereto.

The head-retaining means 114 is fixed to (or formed integrally with) the tray member 112 at one end thereof. The head-retaining means 114 comprises a tunnel, and has a crown end 118 which receives the crown of the cadaver's head, and a neck end 120, which receives the cadaver's neck. The crown end 118 of the tunnel is optionally closed, whilst the neck end 120 is open to receive the head of the cadaver. The head-retaining means 114 flares outwardly towards the neck end 120, such that the neck end 120 of the tunnel is wider than the crown end 118.

The head-retaining means 114 is provided with an aperture 122 in its upper wall. The aperture 122 is very close to the neck end 120.

FIGS. 12*a*, 12*b* and 12*c* show the bone retaining tray 110 with a bioplastic coffin 130 according to a further aspect of the invention loaded thereon.

The bioplastic coffin 130 is an alternative coffin to the silk embodiment of FIGS. 5 to 7.

The bioplastic material is a "Mater-Bi™ thermoplastic biodegradable polymer". Specifically, the bioplastic material is known as "Mater-Bi TF01U/095R" and is available from Novamont SpA, Via Fauser, 8 I-28100, Novara, Italy. Its composition is a biodegradeable polyester containing monomers from vegetable oils. The bioplastic coffin 130 is fully dissolvable in the alkaline hydrolysis process. The bioplastic coffin 130 includes a head end 132 and a feet end 134.

The bioplastic coffin 130 comprises a substantially rigid container, which surrounds and fully encloses the cadaver. The container is injection-moulded. The container typically has a base portion and a lid (not shown), for easy insertion of a cadaver. In this embodiment, the bioplastic coffin 130 is shaped like a sarcophagus, but alternative shapes may also be used. After a fairly flat head portion, the upper profile of the bioplastic coffin 130 (typically on the lid) rises steeply to a peak 136 in the chest area of the cadaver, which then falls away smoothly to the feet end 134.

Figure 13A:
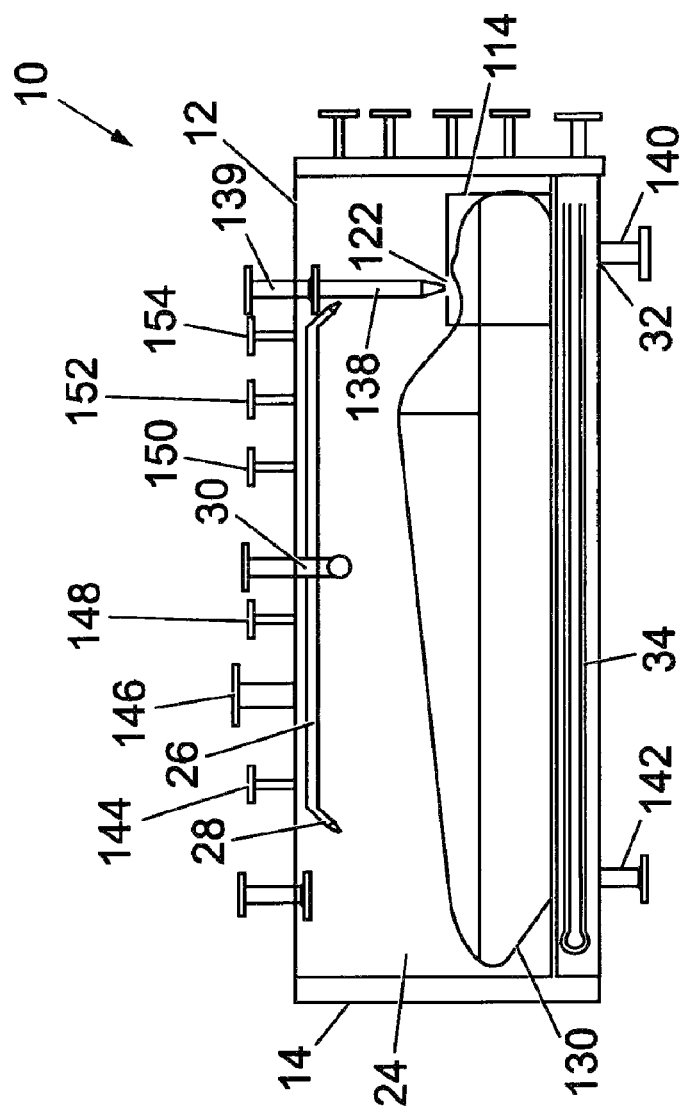
FIGS. 13a and 13b show sectional views of the alkaline hydrolysis unit of FIG. 1, with the coffin and bone retaining tray of FIGS. 12a, 12b and 12c therein.
Figure 13B:
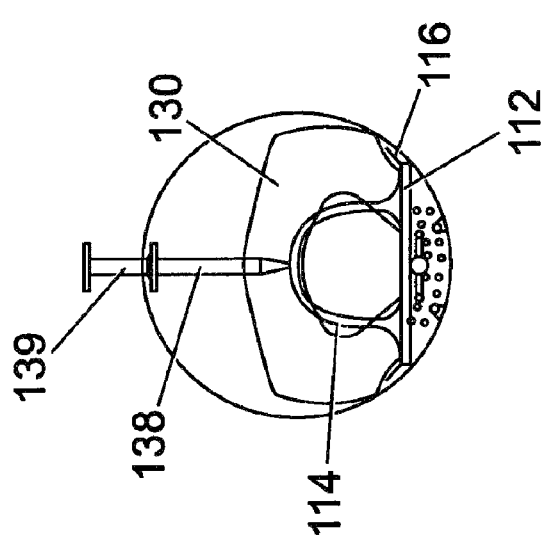

FIGS. 13*a* and 13*b* show the bioplastic coffin 130 in place in the alkaline hydrolysis unit 10, supported on the bone retaining tray 110.

The bone retaining tray 110 and supported bioplastic coffin 130 are located in the chamber 24, with the head retaining means 114 being positioned in a head-receiving part of the chamber 24. In this embodiment, the head-receiving part of the chamber 24 is the end that is furthest from the door 14. The "head-receiving part" of the chamber 24 means the general area of the chamber 24 which receives the head.

The alkaline hydrolysis unit 10 has already been described with reference to FIG. 1, but some additional details are shown in FIGS. 13*a* and 13*b*. These include a recirculation jet 138, which is fluidly connected to the recirculation pump 38 (shown in FIG. 1) by means of a conduit 139. The recirculation jet 138 enters the chamber 24 from its top, and extends downwards as far as the top of the head retaining means 114. The position of the recirculation jet 138 and the position of the aperture 122 in the head retaining means 114 are selected so that, when the bioplastic coffin 130 is correctly positioned in the chamber 24, the recirculation jet 138 is aligned with the aperture 122. The tip of the recirculation jet 138 lies at, or very close to, the aperture 122. The purpose of the aperture 122 is to prevent interference of the head retaining means 114 with the recirculation jet 138.

Due to the shape of the upper profile of the bioplastic coffin 130 (in particular its varying height), and the distance to which the recirculation jet 138 extends into the chamber 24, it is not possible to insert the bioplastic coffin 130 into the chamber 24 in the wrong orientation (i.e. feet first). If this were attempted, the bioplastic coffin 130 could not fit into the chamber 24 because the upper profile of the bioplastic coffin 130 would abut against the recirculation jet 138. Also, the feet end 134 of the coffin 130 would not fit fully within the tunnel of the head retaining means 114.

Hence, the bioplastic coffin 130 has a profile shaped to co-operate with the inner profile of the chamber 24 when the bioplastic coffin 130 is inserted in one orientation (head first), and shaped not to co-operate with the inner profile of the chamber 24 when the bioplastic coffin 130 is inserted in the opposite orientation (feet first), such that the coffin 130 can only fit into the chamber 24 when in its correct orientation. In this embodiment, the recirculation jet 138 forms part of the co-operating inner profile of the chamber 24.

Also shown in FIG. 13a is a drain conduit 140, connected to the drain 32 and which can also be a recirculation suction conduit; and a recirculation return conduit 142; both of which are connected to the base of the chamber 24.

Various conduits/other equipment are also connected to the top of the chamber 24. Besides the conduit 139 and the water inlet 30 (used to fill and rinse the chamber 24), these include a vacuum breaker 144, a vent 146, a pressure relief valve 148, a pressure transducer 150, a pressure gauge and switch 152, and a vessel thermocouple 154.

In use, the embodiment shown in FIGS. 11 to 13 functions in the same way as explained in respect of FIGS. 1 to 10. Aiming the recirculated fluid directly at the head of the cadaver via recirculation jet 138 helps to ensure that the head fully decomposes. This can considerably reduce the time needed to dissolve a cadaver.

The head retaining means 114 retains the head of the cadaver in the head-receiving part of the chamber 24. As shown in FIG. 13a, because the aperture 122 is very close to the neck end 120 of the head retaining means 114, the head of the cadaver (or most of the head) lies to the right of the recirculation jet 138 and the aperture 122. If the head of the cadaver were to break off from the neck, the head is restrained from floating vertically upwards, and from moving laterally, due to the head retaining means 114 (see FIG. 13b). Floatation is the most likely type of movement to occur. However additionally, the head cannot move longitudinally to the left in FIG. 13a (towards the feet end of the chamber) due to the recirculated fluids from the jet 138 impacting in what was the neck area of the cadaver, thereby urging the head of the cadaver to the right. The head cannot move to the right due to abutment against either the crown end 118 of the tunnel (if closed) or the wall of the chamber 24.

Figure 14:
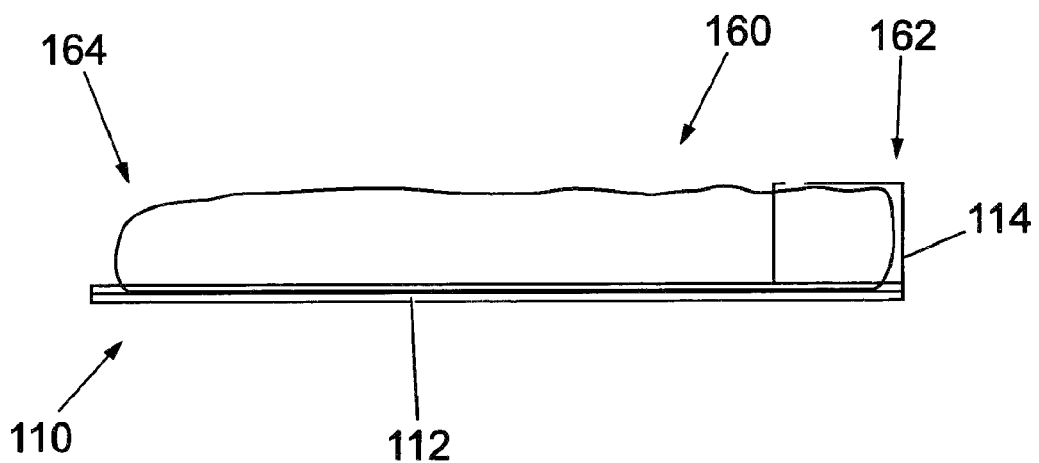
FIG. 14 shows a side view of the bone retaining tray of FIGS. 11a, 11b and 11c and a coffin of a further embodiment of the invention loaded on the tray.

An alternative embodiment of a bioplastic coffin 160 is shown in FIG. 14, located on the tray 110. The bioplastic coffin 160 comprises a flexible bag, instead of a substantially rigid container. The flexible bag has a thickness of approximately 100 microns.

The material of the bioplastic coffin 160 is a "Mater-Bi™ thermoplastic biodegradable polymer". Specifically, the composition comprises starch, polyesters and plasticizers. This bioplastic material is available from Novamont SpA, Via Fauser, 8 I-28100, Novara, Italy.

The bioplastic coffin 160 is fully dissolvable in the alkaline hydrolysis process. The bioplastic coffin 160 includes a head end 162 and a feet end 164.

The tray 110 and flexible bioplastic coffin 160 is inserted into the alkaline hydrolysis unit 10, in the same way as shown in FIG. 13 in respect of the non-flexible bioplastic coffin 130. In use, the embodiment shown in FIG. 14 functions in the same way as explained in respect of FIGS. 11 to 13.

Figure 15:
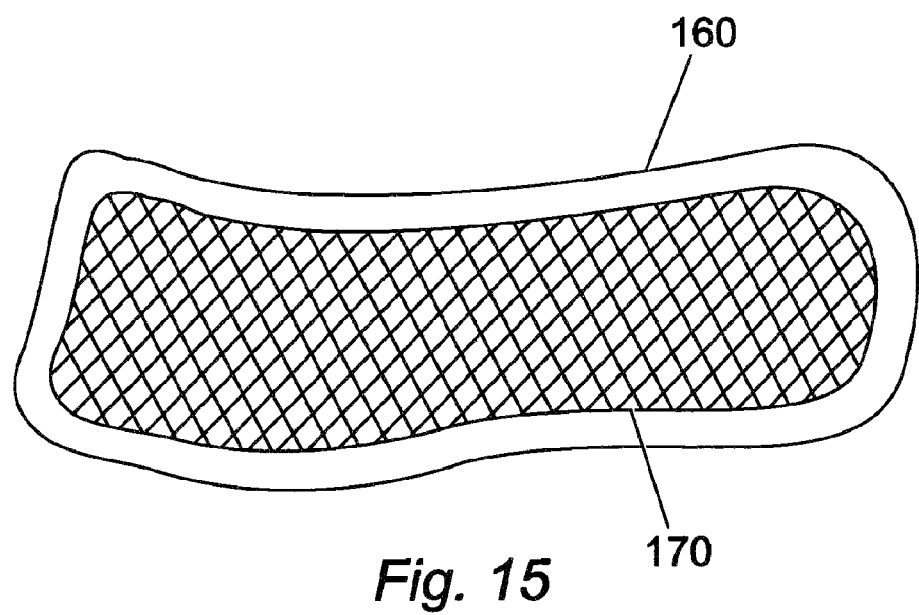
FIG. 15 is a schematic drawing and shows the coffin of FIG. 14, with a non-dissolvable mesh receptacle located inside the coffin.

FIG. 15 shows the flexible bioplastic coffin 160 of FIG. 14, and also a non-dissolvable plastic mesh receptacle 170 inside the bioplastic coffin 160. In this example, the mesh is polytetrafluoroethylene (PTFE), but any other non-dissolvable material could alternatively be used. The cadaver would be placed within the mesh receptacle 170, which in turn is within the bioplastic coffin 160. FIG. 15 is a schematic drawing, and in particular the mesh would be much finer than shown, fine enough to retain substantially all of the bone residue of the cadaver, after the rest of the cadaver has dissolved, whilst still being course enough to allow the flow of fluids into and out of the mesh receptacle 170.

Modifications and improvements can be incorporated without departing from the scope of the invention. For example, the dissolvable receptacle can be made from any material that is decomposable in an alkaline hydrolysis process.

The coffin assembly does not necessarily need to be a cuboid shape, and could be any shape, although it is preferable if the coffin conceals the shape of the cadaver when closed.

The coffin is not necessarily closable—e.g. the dissolvable receptacle could be open at its upper surface.

The frame 42 could optionally have a different form, e.g. more or fewer posts, and the base of the frame is not necessarily a mesh.

In some embodiments, the hot water tanks of FIGS. 9 and 10 are not used, and water from the mains water supply is heated from cold in the alkaline hydrolysis unit 10.

The means to heat and cool the chamber 12 is not necessarily via heating/cooling tube 34. Any suitable heating/cooling means can be used. For example, direct gas injection, or any kind of conduction/convection.

In some embodiments, all waste fluids go directly into the sewer system after cooling (not via any effluent tank/flash tank).

In some alternative embodiments, all waste fluids to into the sewer system, via a flash tank, and then into the sewer system (but not via any effluent tank).

In accordance with the fourth to the eighth aspects of the present invention, it should be noted that the presence of a coffin of the first and second aspects of the invention is not an essential feature in such systems/apparatus/methods.

For example, in some embodiments, a coffin comprising a dissolvable receptacle is not used, and a cadaver can be placed directly into the basket 36. Hence, in the above described exemplary method, the steps relating to the coffin can be omitted, whilst however retaining any or all of the other method/system/apparatus features.

Any of the features of the eight aspects of the invention can be incorporated and used with any of the other of the eight aspects of the invention.

In the embodiment of FIGS. 11a, 11b and 11c, the aperture 122 is not necessarily in the top surface of the head retaining means 114, and the recirculation jet does not necessarily extend downwards from the top of the alkaline hydrolysis unit 10. In other embodiments, the aperture 122 may be provided in one of the sides of the tunnel, and the recirculation jet could extend into the chamber of the alkaline hydrolysis unit from one side, instead of from above.

The mesh receptacle 170 of FIG. 15 is shown inside the bioplastic coffin 160, but could alternatively be located on the outside, around the bioplastic coffin 160. Since the bioplastic coffin 160 will ultimately be dissolved in the process, there is no real difference, as the end result will still be the bone residue retained within the mesh receptacle 170. Further alternatively, the mesh receptacle 170 may be fixed to, or formed integrally with, the bioplastic coffin 160.

Although the mesh receptacle 170 is only illustrated with the flexible bioplastic coffin 160, it could also be used within or outside of any of the other dissolvable receptacles, e.g. the substantially rigid bioplastic coffin 130, or the silk and metal frame embodiment.

The tunnel-shaped head retaining means 114 of FIG. 11 could alternatively be replaced by a head strap.

The invention claimed is:

1. An alkaline hydrolysis unit comprising:
   a chamber for receiving a cadaver to be chemically decomposed, the chamber including a head-receiving part, intended to receive the head of the cadaver;
   a recirculation pump fluidly connected to the chamber of the alkaline hydrolysis unit and adapted to recirculate fluids within the chamber;
   a head retaining means locatable in the chamber, for retaining the head of the cadaver in the head-receiving part of the chamber; and
   at least one recirculation jet fluidly connected to the recirculation pump and position to aim fluid from the recirculation pump at the head-receiving part of the chamber.

2. An alkaline hydrolysis unit as claimed in claim 1, wherein the jet projects into the chamber, in close proximity to the head-receiving part of the chamber.

3. An alkaline hydrolysis unit as claimed in claim 1, including a support frame, and wherein the head retaining means comprises part of the support frame.

4. An alkaline hydrolysis unit as claimed in claim 3, wherein the head retaining means comprises a tunnel, adapted to at least partially surround a head of a cadaver.

5. An alkaline hydrolysis unit as claimed in claim 4, wherein the head-receiving part of the chamber is bounded by an underside of the tunnel, the recirculation jet and an end of the chamber.

6. An alkaline hydrolysis unit as claimed in claim 4, wherein the tunnel includes an aperture in a wall thereof which, when the support frame is correctly positioned in the chamber, is aligned with the recirculation jet.

7. An alkaline hydrolysis unit as claimed in claim 1, wherein the head retaining means comprises a strap.

8. An alkaline hydrolysis unit as claimed in claim 1, wherein the head retaining means is adapted to restrain vertical movement of a head of a cadaver in the chamber.

9. An alkaline hydrolysis unit as claimed in claim 8, wherein the head retaining means is adapted to restrain movement of a head of a cadaver in all directions.

10. An alkaline hydrolysis unit as claimed in claim 1, wherein the location of the head retaining means is adjustable relative to the longitudinal axis of the chamber.

11. An alkaline hydrolysis unit as claimed in claim 1, wherein the alkaline hydrolysis unit is adapted for use with a coffin, insertable within the chamber, and wherein the coffin has a profile shaped to co-operate with the inner profile of the chamber when the coffin is inserted in a correct orientation, and shaped not to co-operate with the inner profile of the chamber when the coffin is inserted in the opposite, incorrect orientation, thereby preventing entry of the coffin into the chamber in the incorrect orientation.

12. An alkaline hydrolysis unit as claimed in claim 11, wherein the recirculation jet forms part of the co-operating inner profile of the chamber.

* * * * *